(12) United States Patent
    Khare et al.

(10) Patent No.: US 12,657,084 B2
(45) Date of Patent: Jun. 16, 2026

(54) ROOT CAUSE ANALYSIS (RCA)-BASED NODE RECOVERY

(71) Applicant: Microsoft Technology Licensing, LLC, Redmond, WA (US)

(72) Inventors: Atul Khare, Sammamish, WA (US); Eli Cohen-Nehemia, Yokenam (IL); Bhushan Mehendale, Bellevue, WA (US); Karunakara Kotary, Redmond, WA (US); Shruti Gupta, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/744,385

(22) Filed: Jun. 14, 2024

(65) Prior Publication Data

US 2025/0383952 A1 Dec. 18, 2025

(51) Int. Cl.
    *G06F 11/00* (2006.01)
    *G06F 9/40* (2006.01)
    *G06F 9/455* (2018.01)
    *G06F 11/07* (2006.01)

(52) U.S. Cl.
    CPC ........ *G06F 11/079* (2013.01); *G06F 9/45558* (2013.01); *G06F 11/0721* (2013.01); *G06F 2009/45591* (2013.01)

(58) Field of Classification Search
    CPC ............... G06F 11/079; G06F 11/0721; G06F 9/45558; G06F 2009/45591
    See application file for complete search history.

(56) References Cited

U.S. PATENT DOCUMENTS

2006/0143531 A1* 6/2006 Kilian ................. G06F 11/3648
                                                714/38.14
2013/0212436 A1* 8/2013 Zhu ..................... G06F 11/0763
                                                714/35

OTHER PUBLICATIONS

Extended European Search Report received for EP Application No. 25180225.2, mailed on Dec. 11, 2025, 9 Pages.

* cited by examiner

*Primary Examiner* — Philip Guyton
*Assistant Examiner* — Sean Kevin Mcnamara

(57) ABSTRACT

Systems and methods are provided for implementing improved root cause analysis ("RCA")-based node recovery. After instructing a node to enter a debug mode and based on a determination that an expected response timeout duration has elapsed, a controller instructs the node to enter a system management mode ("SMM"), and exposes a shared buffer to an SMM handler of the node. The shared buffer includes instructions for the SMM handler to set a trap flag in a saved state area of an operating system ("OS") of the node and to use a resume execution instruction after setting the trap flag. The trap flag causes the OS to transfer control of problematic code to a trap handler, which performs operations or calls a hypervisor for a virtual machine extension ("VMX") root mode depending on whether the problematic code execution occurs in a non-maskable interrupt ("NMI") handler.

19 Claims, 10 Drawing Sheets

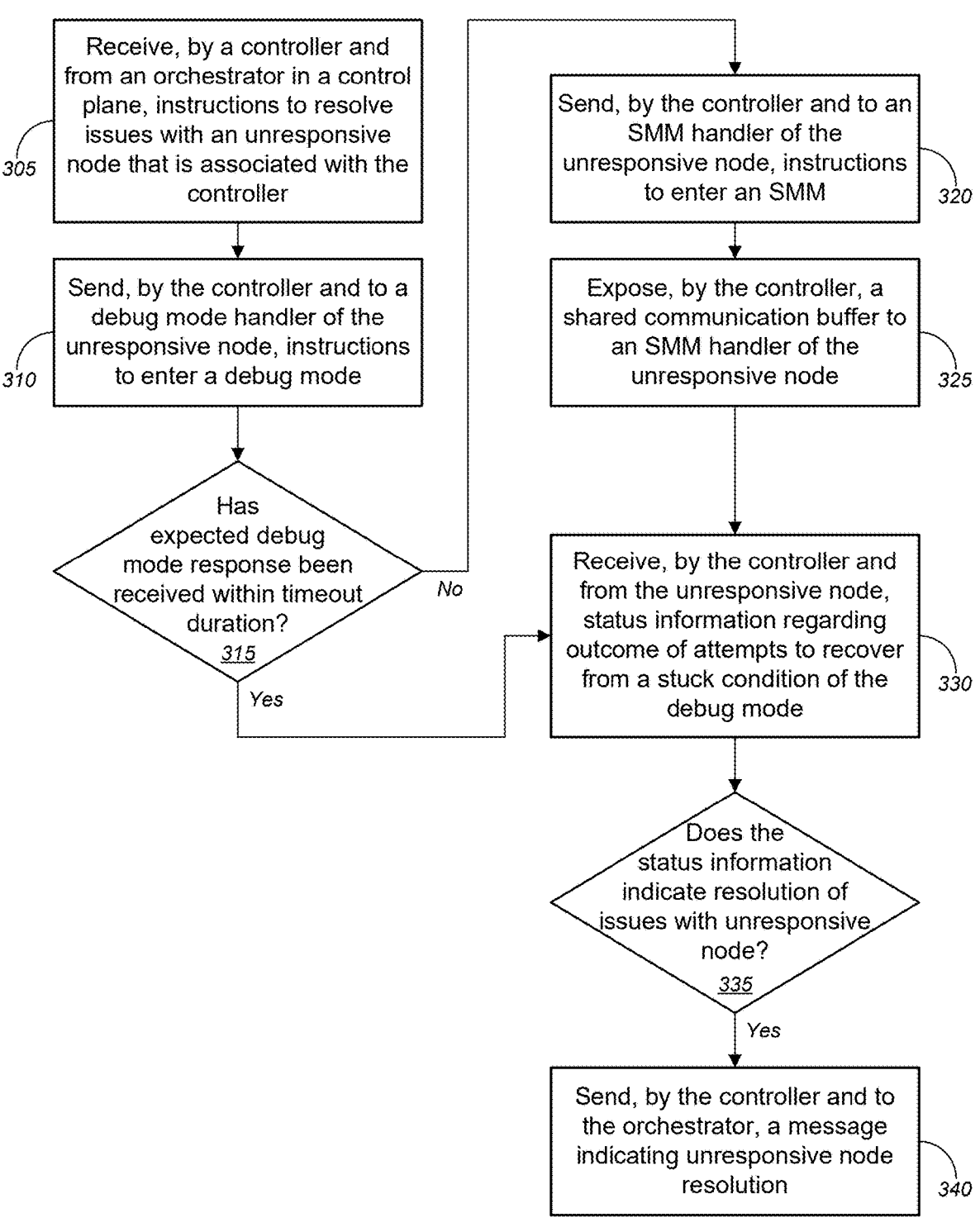

305 Receive, by a controller and from an orchestrator in a control plane, instructions to resolve issues with an unresponsive node that is associated with the controller 310 Send, by the controller and to a debug mode handler of the unresponsive node, instructions to enter a debug mode 315 Has expected debug mode response been received within timeout duration?

No

Yes

320 Send, by the controller and to an SMM handler of the unresponsive node, instructions to enter an SMM 325 Expose, by the controller, a shared communication buffer to an SMM handler of the unresponsive node 330 Receive, by the controller and from the unresponsive node, status information regarding outcome of attempts to recover from a stuck condition of the debug mode 335 Does the status information indicate resolution of issues with unresponsive node?

Yes

340 Send, by the controller and to the orchestrator, a message indicating unresponsive node resolution

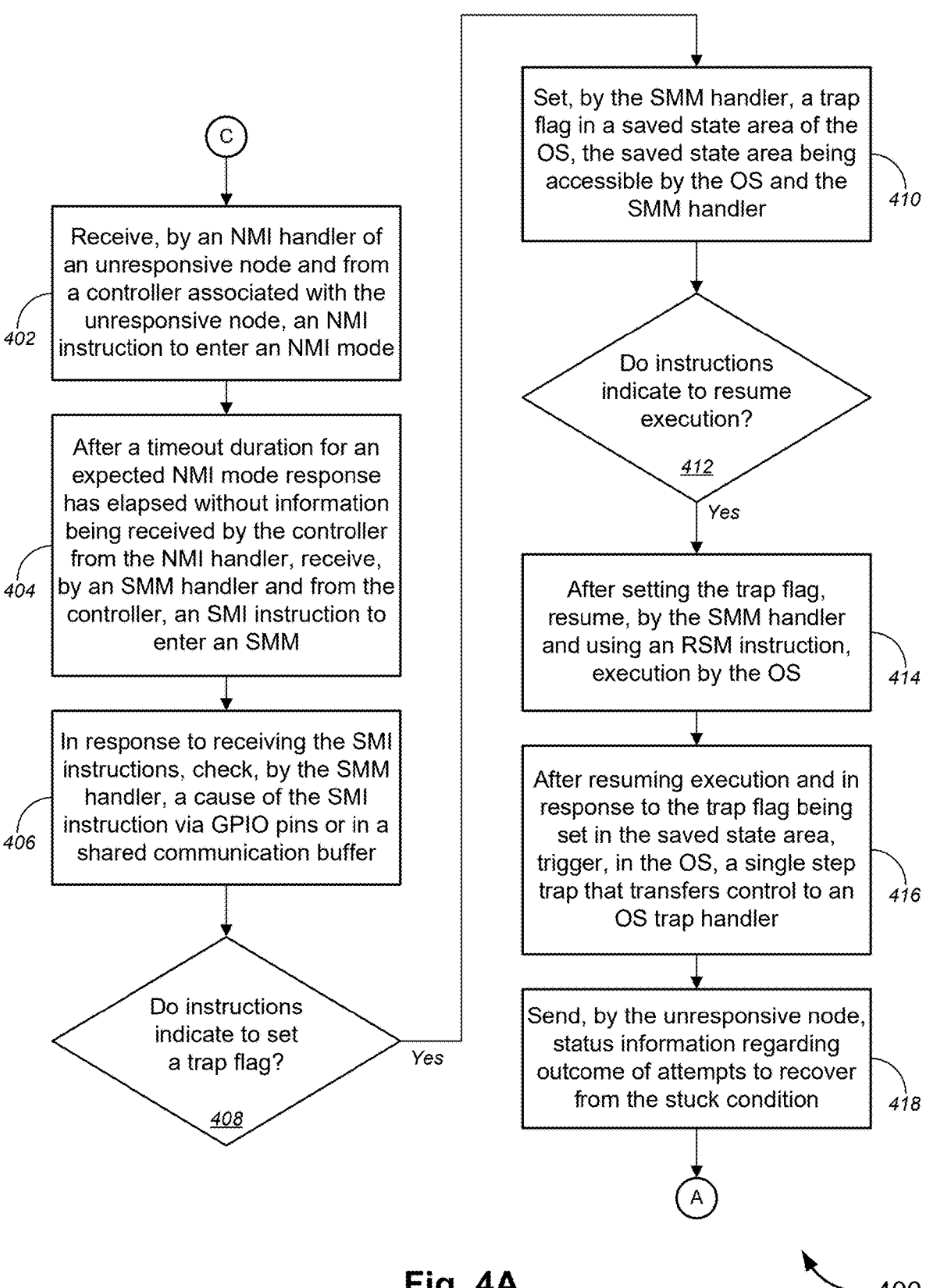
Fig. 4A                                                          400

400

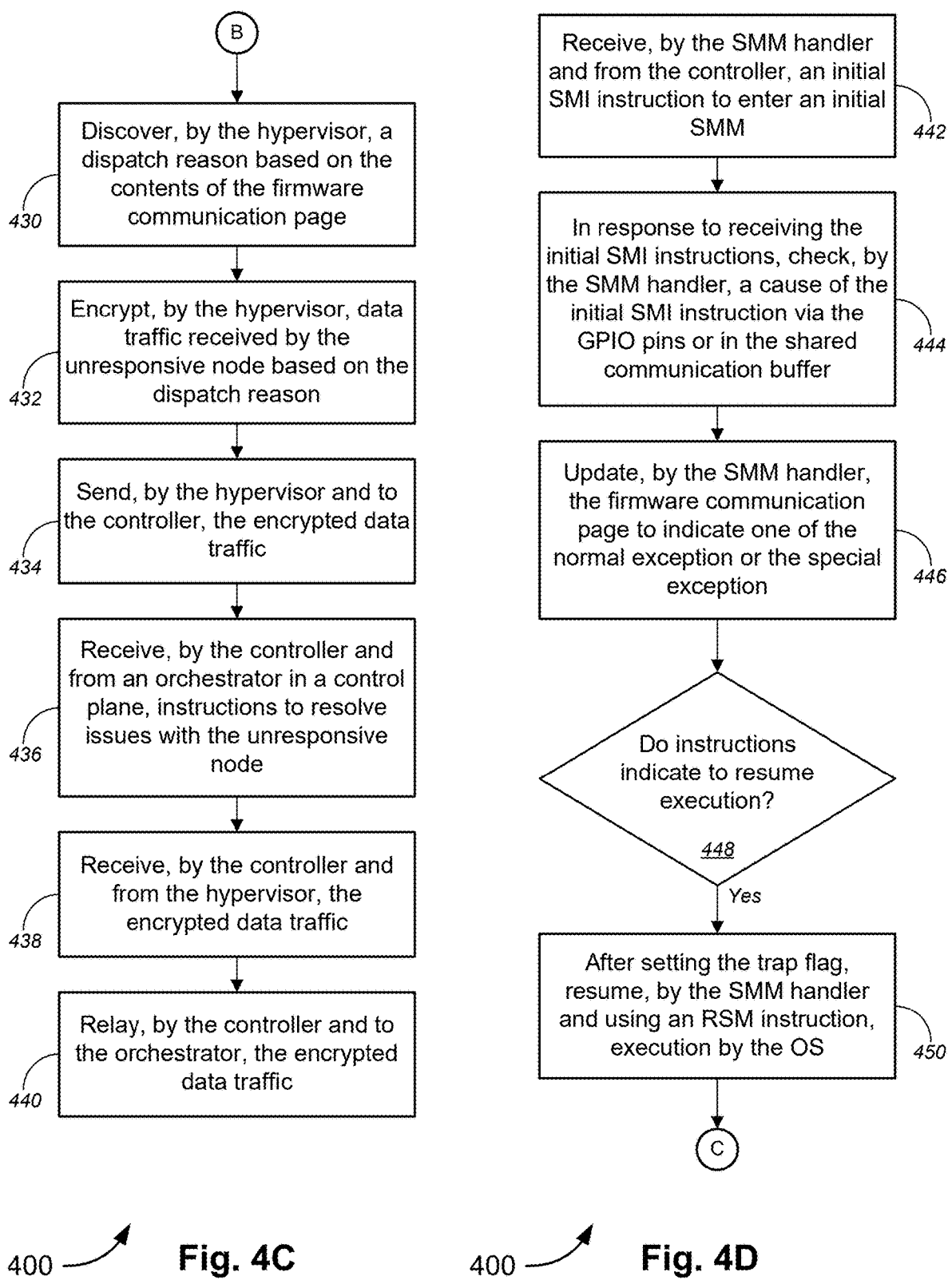

B

Discover, by the hypervisor, a dispatch reason based on the contents of the firmware communication page

430

Encrypt, by the hypervisor, data traffic received by the unresponsive node based on the dispatch reason

432

Send, by the hypervisor and to the controller, the encrypted data traffic

434

Receive, by the controller and from an orchestrator in a control plane, instructions to resolve issues with the unresponsive node

436

Receive, by the controller and from the hypervisor, the encrypted data traffic

438

Relay, by the controller and to the orchestrator, the encrypted data traffic

Receive, by the SMM handler and from the controller, an initial SMI instruction to enter an initial SMM

442

In response to receiving the initial SMI instructions, check, by the SMM handler, a cause of the initial SMI instruction via the GPIO pins or in the shared communication buffer

444

Update, by the SMM handler, the firmware communication page to indicate one of the normal exception or the special exception

446

Do instructions indicate to resume execution?

448

Yes

After setting the trap flag, resume, by the SMM handler and using an RSM instruction, execution by the OS

ROOT CAUSE ANALYSIS (RCA)-BASED NODE RECOVERY

BACKGROUND

With increasing software complexity, debugging and performing root cause analyses in a fleet of network nodes becomes increasingly challenging. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for implementing improved root cause analysis ("RCA")-based node recovery. After sending instructions to a node to enter a debug mode (e.g., a non-maskable interrupt ("NMI") mode), a controller (e.g., a baseboard management controller ("BMC")) determines whether an expected response timeout duration has elapsed, which may be indicative of the debug mode (or the NMI mode) being in a stuck condition. Based on such determination, the controller sends instructions to the node to enter a system management mode ("SMM"), and exposes a shared communication buffer to an SMM handler of the node. The shared communication buffer includes instructions for the SMM handler to set a trap flag in a saved state area of an operating system ("OS") of the node and instructions for the SMM handler to resume execution using a Resume from System Management mode ("RSM") instruction after setting the trap flag. After the SMM handler sets the trap flag and uses the RSM instruction to resume execution, the OS is caused to exit from problematic code execution that is causing the stuck condition and to transfer control of the problematic code to an OS trap handler of the node. The OS trap handler performs operations or calls a hypervisor for a virtual machine extension ("VMX") root mode depending on whether the problematic code execution occurs in an NMI handler.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIG. 3 depicts an example method for implementing improved RCA-based node recovery.

FIGS. 4A-4D depict another example method for implementing improved RCA-based node recovery.

DETAILED DESCRIPTION OF CERTAIN EMBODIMENTS

As briefly discussed above, as software complexity increases, it becomes increasingly challenging to debug and perform root cause analyses of issues with network nodes. Often times, the nodes are unresponsive and even traditional analysis mechanisms like NMI do not function, which leaves the root cause of the unresponsive nodes unknown or difficult to determine. Even debug mechanisms like NMI-based crash dumps can fail for reasons that cannot be completely determined. One potential reason behind the failure of NMI-based crash dumps is that code execution may be stuck inside the NMI handler itself, meaning that subsequent NMIs will not be recognized. Yet another possibility is that there is a bug in a crash dump storage stack, which makes completion of the operation difficult, if not impossible. As a result, the exact cause of the failure is difficult to determine. Since the failure happens when a host-CPU or an OS (collectively referred to herein as "OS") is already processing an NMI, the only viable option is to use an interrupt with a higher priority to try and determine the cause of the failure. On x86 or similar platforms, the only remaining option is to use a system management interrupt ("SMI"), which is the highest priority interrupt.

The present technology provides for an improved RCA-based node recovery, which resolves at least some of these issues by allowing the OS to break of out the stuck condition (even if the stuck condition occurs in an NMI handler), by using SMI, and to enable initiation of diagnostics in conjunction with the BMC and control plane elements, as described in detail below with respect to the figures.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing root cause analysis, and, more particularly, to methods, systems, and apparatuses for implementing improved RCA-based node recovery, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1A:
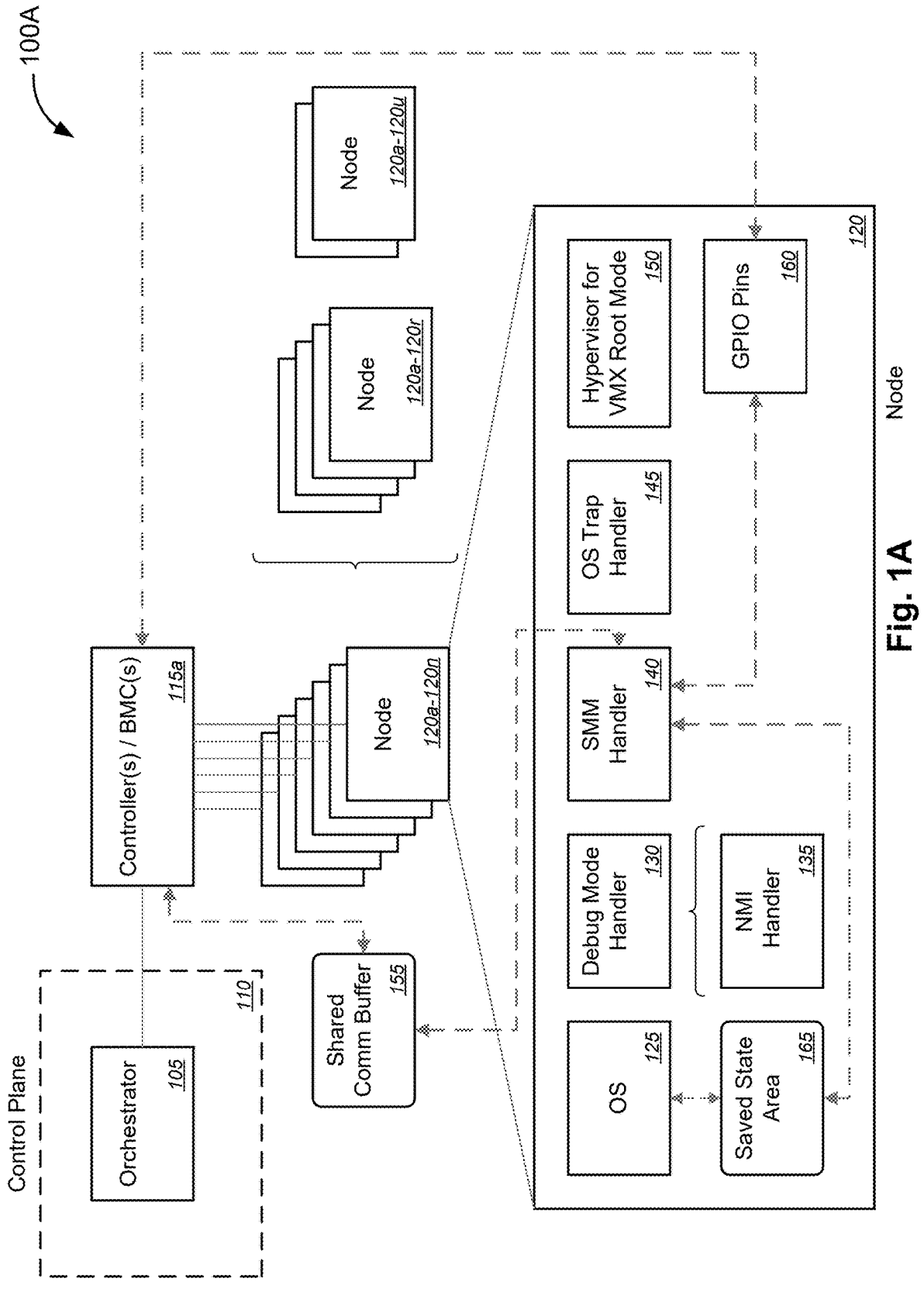
FIGS. 1A and 1B depict various example systems for implementing improved RCA-based node recovery.
Figure 1B:
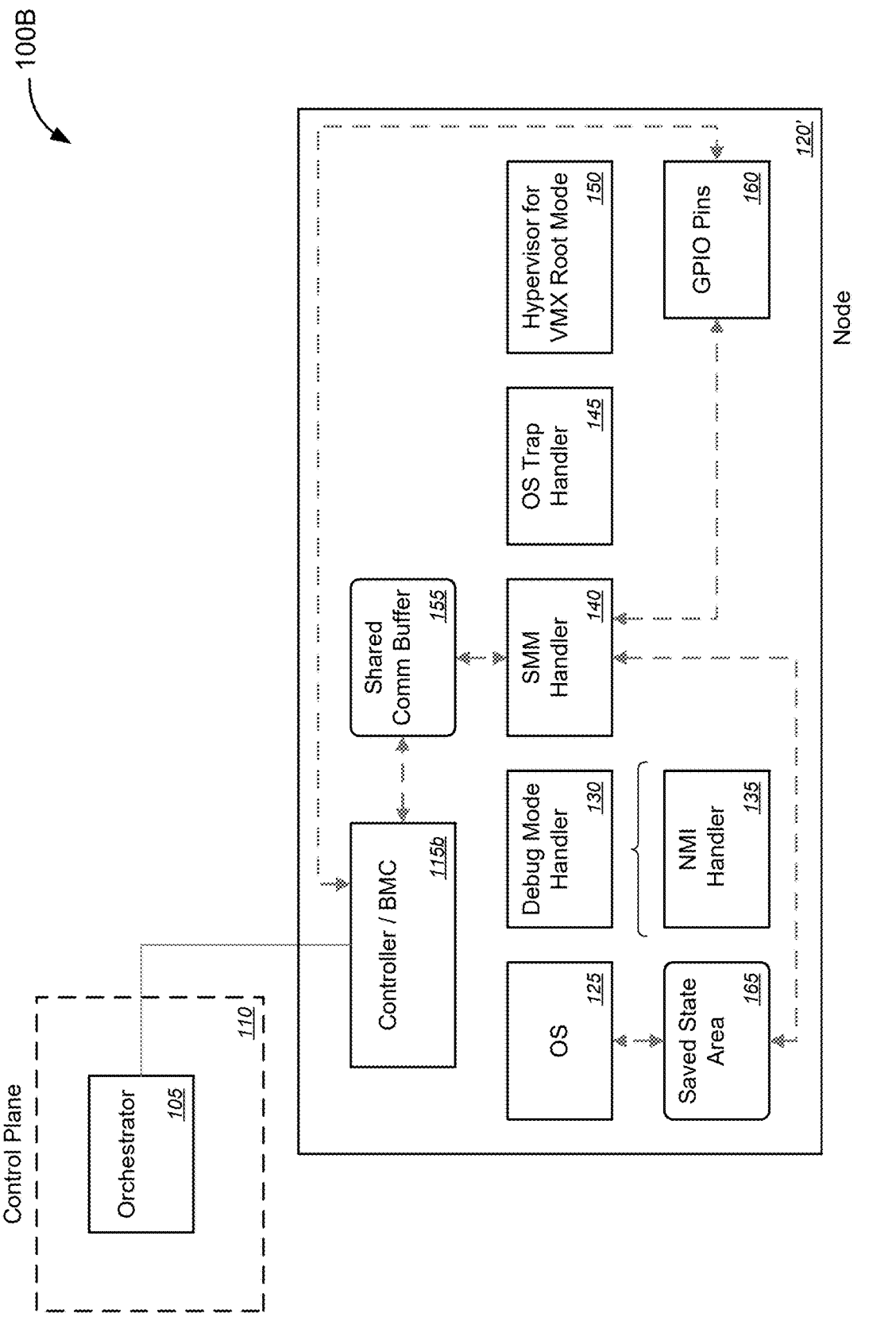

FIGS. 1A and 1B depict various example systems 100A and 100B for implementing improved RCA-based node recovery. With reference to FIG. 1A, system 100A includes an orchestrator 105 in a control plane 110. System 100A further includes at least one controller (e.g., BMC) 115a and a plurality of nodes 120a-120n (collectively, "nodes 120"). In an example, one controller (or BMC) 115a controls one of the nodes 120. In another example, one controller (or BMC) 115a controls multiple nodes 120. The plurality of nodes 120 includes one or more responsive nodes 120a-120r and/or one or more unresponsive nodes 120a-120u. Herein, n, r, and u are non-negative integer numbers that may be either all the same as each other, all different from each other, or some combination of same and different (e.g., one set of two or more having the same values with the others having different values, a plurality of sets of two or more having the same value with the others having different values). Each node 120 includes an OS 125 and a debug mode handler 130, which may include an NMI handler 135. Each node 120 further includes an SMM handler 140, an OS trap handler 145, and a hypervisor 150 for a VMX root mode. System 100A further includes a shared communication buffer 155, general purpose input/output ("GPIO") pins 160, and a saved state area 165.

System 100A of FIG. 1A is directed to an embodiment in which the OS 125, the debug mode handler 130 or NMI handler 135, the SMM handler 140, the OS trap handler 145, and the hypervisor 150 are part of the node 120, while the controller 115a is external, yet communicatively coupled, to the node 120. System 100B of FIG. 1B, however, is directed to an embodiment in which the controller 115b is part of node 120', along with the OS 125, the debug mode handler 130 or NMI handler 135, the SMM handler 140, the OS trap handler 145, and the hypervisor 150. Node 120' of FIG. 1B is otherwise similar, if not identical, to node 120 of FIG. 1A.

Referring to FIGS. 1A and 1B, the orchestrator 105, or the control plane 110 in which the orchestrator 105 is located, is configured to detect unresponsiveness of a node (e.g., one of unresponsive nodes 120a-120u) and to instruct a controller 115a or 115b to resolve issues with the unresponsive node. The controller 115a or 115b is configured to manage and control the plurality of nodes 120a-120n or 120', to relay or send instructions from the orchestrator 105 to the nodes 120 or 120' (e.g., to the OS 125 of the nodes 120 or 120') to enter into an SMM (using an SMI instruction) or to enter into an NMI mode (using an NMI instruction), to expose the shared communication buffer 155 to an SMM handler 140, to send instructions to the SMM handler 140 over the GPIO pins 160, and/or to relay status information or gathered information from the nodes 120 or 120' to the orchestrator 105 or the control plane 110. As used herein, exposing the shared communication buffer refers to providing a component (in this case, the SMM handler 140) access to the shared communication buffer or instructing the component to access the shared communication buffer. In some examples, the shared communication buffer 155 (e.g., referred to as a mailbox) is a common or shared storage area accessible by the controller 115a or 115b and the SMM handler 140 (as denoted by the dash-lined double-headed arrows in FIG. 1A or 1B between the shared communication buffer 155 and each of the SMM handler 140 and the controller 115a or 115b). In examples, instructions may be stored or included in the shared communication buffer 155, such instructions including instructions for the SMM handler 140 to set a trap flag in a saved state area 165 of the OS of the unresponsive node and instructions for the SMM handler to resume execution using an RSM instruction after setting the trap flag. In some examples, the instructions to set a trap flag in the saved state area 165 is sent to the SMM handler 140 over the GPIO pins 160. In examples, the saved state area 165 is a common or shared storage area accessible by the OS 125 and the SMM handler 140 (as denoted by the dash-lined double-headed arrows in FIG. 1A or 1B between the save state area 165 and each of the SMM handler 140 and the OS 125). The trap flag being set in the saved state area causes the OS to exit from problematic code execution and to transfer control to the OS trap handler 145. The OS trap handler 145 performs, within a kernel mode, operations on a problematic code that has caused a stuck condition. By operating on the problematic code in the kernel mode, the OS trap handler 145, in some cases, causes code execution to exit from the stuck condition. The OS trap handler 145 either returns information resulting from operation on the problematic code in the kernel mode and/or returns status information regarding operation of problematic code in the kernel mode. For special cases, such as where the stuck condition occurs in the NMI handler itself, the OS trap handler 145 calls hypervisor 150, which operates on the problematic code in the root mode to cause code execution to exit from the stuck condition that had occurred in the NMI handler.

In operation, the controller 115a or 115b and/or the OS 125 may perform methods for implementing improved RCA-based node recovery, as described in detail with respect to FIGS. 2-4D. For example, the example sequence flow 200 as described below with respect to FIGS. 2A-2C, the example method 300 as described below with respect to FIG. 3, and the example method 400 as described below with respect to FIGS. 4A-4D may be applied with respect to the operations of system 100 of FIG. 1.

In some aspects, even if a stuck condition occurs in an NMI handler (e.g., NMI handler 135), a higher priority interrupt may be used. On x86 or similar platforms, the only remaining option is to use an SMI, which is the highest priority interrupt. Injecting or triggering an SMI causes the OS to transition out the problematic code executing at NMI priority, and switches to an SMM. While SMM could be used to debug the issue in NMI, such an approach is fraught with risk, as SMM vulnerabilities (e.g., memory corruption in an SMI handler) have been discovered on computing platforms, and adding a diagnostic code to SMM is highly undesirable as memory corruption may occur to affect operation of the diagnostic code. The improved RCA-based node recovery techniques described herein resolve issues with a stuck condition resulting in an unresponsive node, by using SMI that allows the OS to break of out the stuck condition (even if in the NMI handler) and to enable initiation of diagnostics in conjunction with the BMC and control plane elements. The issue regarding SMM vulnerabilities may also be obviated by making a change to the SMM handler and relying on the OS to perform the bulk of operations. In examples, the SMM handler is changed by setting the "trap flag" (EFLAGS.TF) or a trap flag ("TF") bit in the SMM saved state area for target OSs, as opposed to changing the flags within the SMM. When the system enters the SMM, general-purpose registers and an OS flag register are saved in the SMM saved state area. On x86 or similar platforms, if the TF bit is set, a single step trap (also referred to as "Int 1" trap) is generated on execution of the next instruction after resumption of execution by the OS. After setting the TF bit, the SMM mode is exited using the RSM instruction, which resumes code execution.

When the OS resumes execution, the first instruction execution after resumption of code execution causes the OS to exit from the problematic code execution and to transfer control to the OS trap handler for the single step trap. This occurs regardless of the interrupt priority level because such exceptions cannot be masked. The single step trap is used by debuggers and other software running on the OS. In the case of a normal exception (e.g., an exception where the problematic code is not at the NMI handler), operation of the problematic code within a kernel mode resolves the stuck condition (referred to herein as "normal exception dispatch"). In the case of a special exception (e.g., an exception where the problematic code is at the NMI handler), although an improbable scenario, the platform firmware is caused to expose a page that is mapped as read-only by the OS. This page contains a status field that can be used to determine whether the single step trap or exception is a special exception. The status field is set by the SMM handler to indicate the special exception. The OS trap handler uses this status field and other conditions to determine that the single step trap is an attempt to recover from a "stuck in NMI" scenario. The hypervisor performing operations on the problematic code in root mode resolves the stuck condition even if the stuck condition is at the NMI handler. At this point, the NMI handler can initiate communication with the BMC, which in turn can relay the information to the control plane.

Figure 2A:
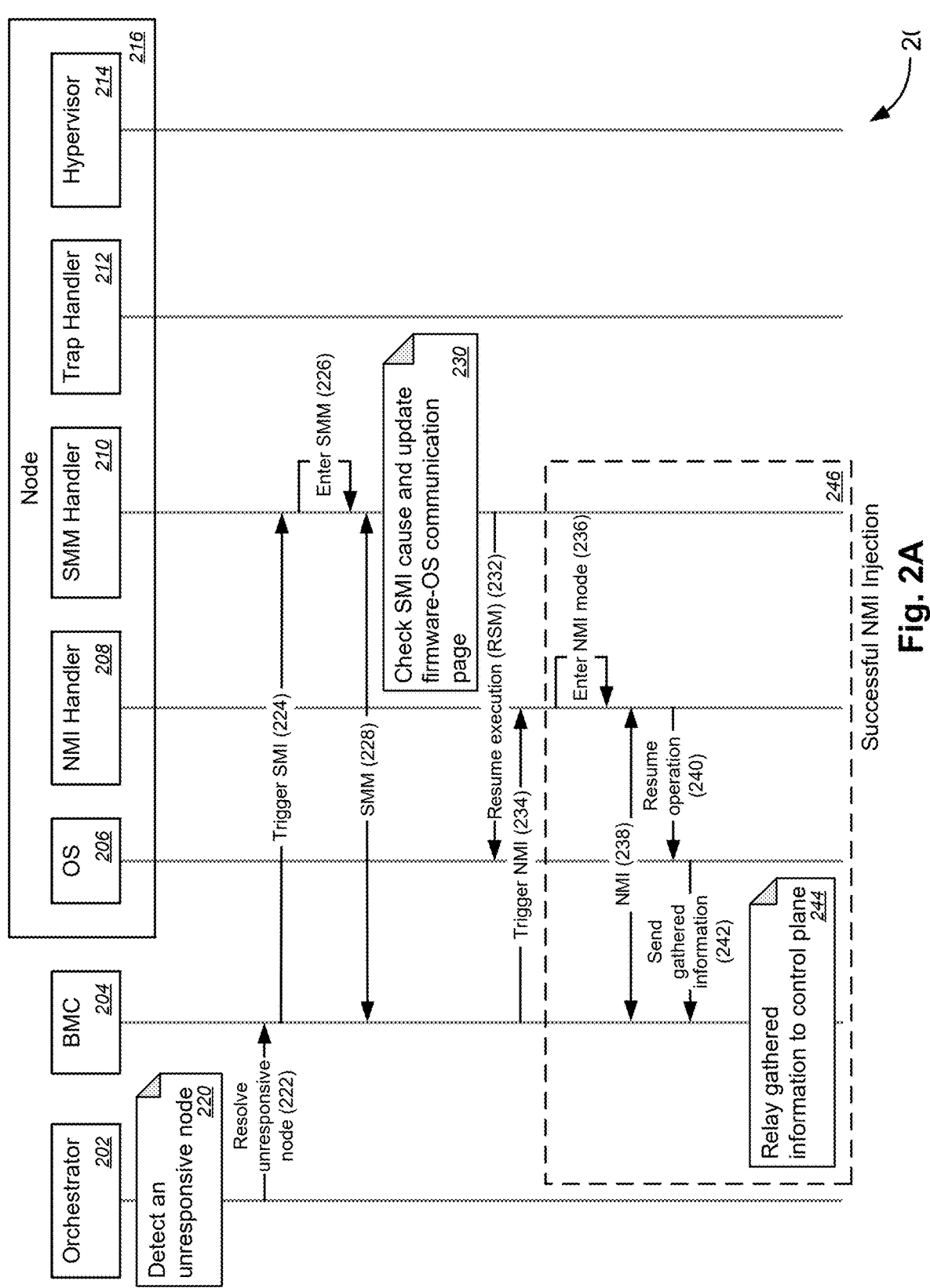
FIGS. 2A-2C depict an example sequence flow for implementing improved RCA-based node recovery.
Figure 2B:
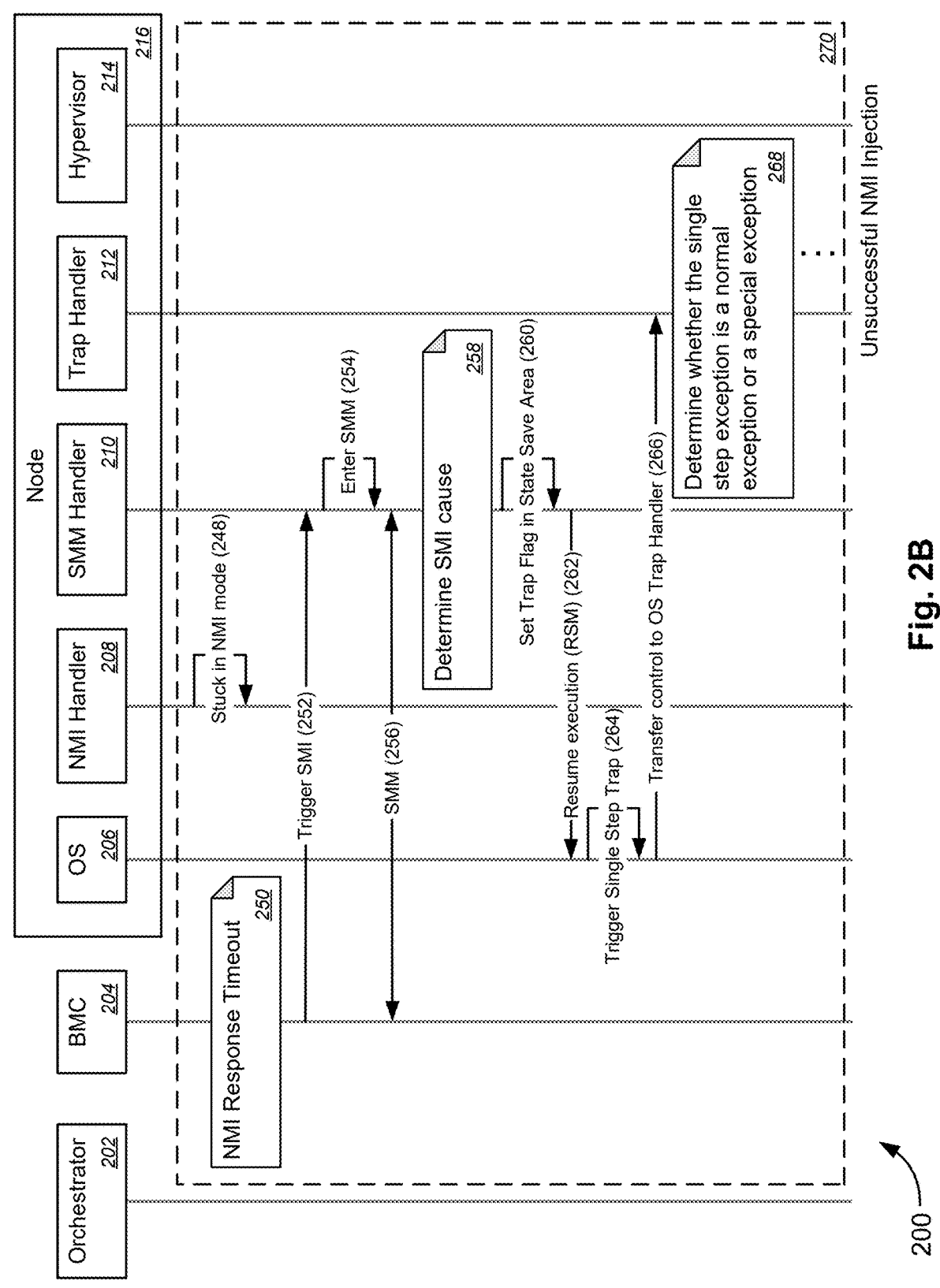
Figure 2C:
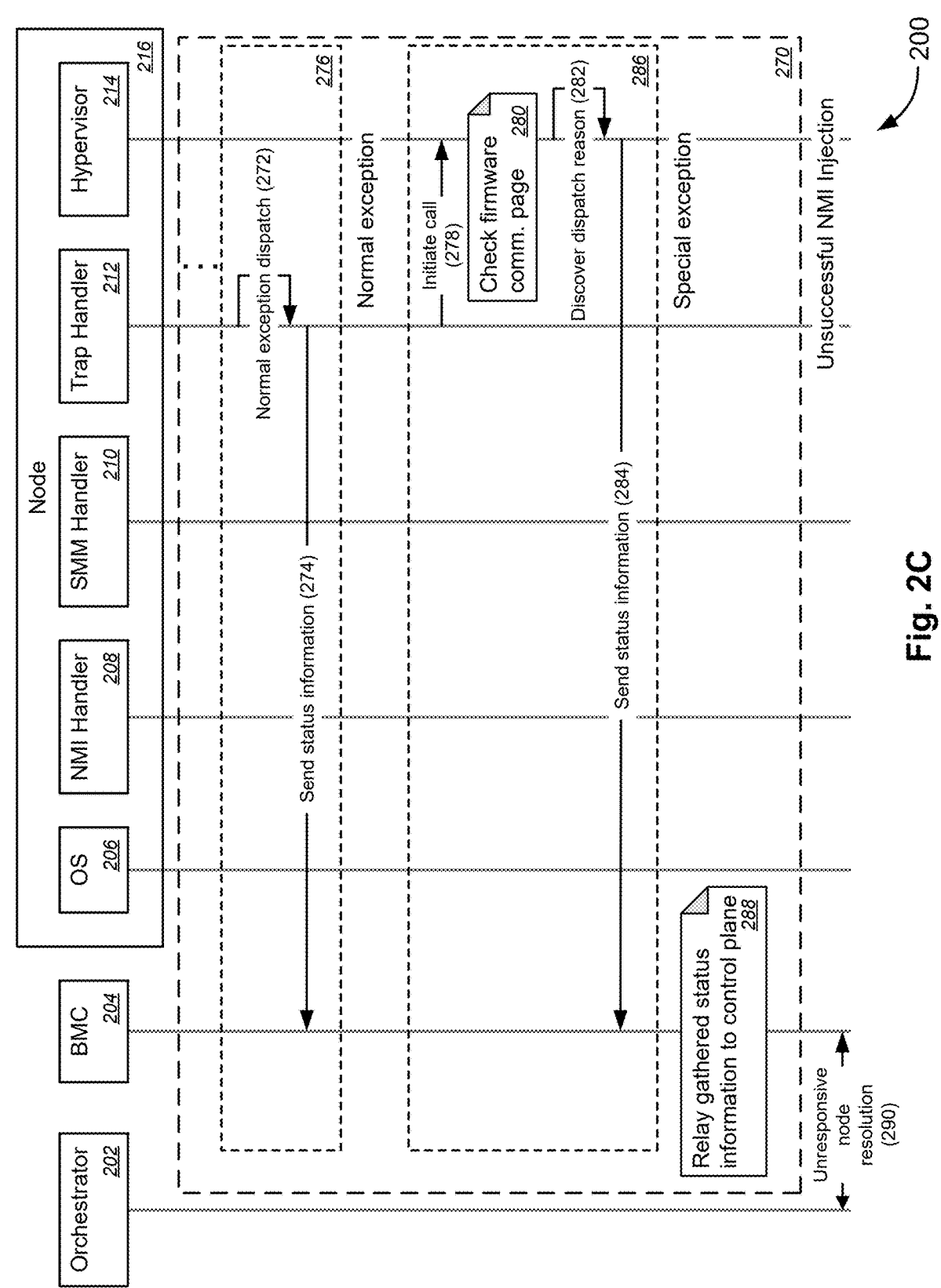

FIGS. 2A-2C depict an example sequence flow 200 for implementing improved RCA-based node recovery. The example sequence flow 200 includes processes performed by an orchestrator 202, a BMC 204, an OS 206, an NMI handler 208, an SMM handler 210, a trap handler 212, and a hypervisor 214 for a VMX root mode. In examples, the OS 206, the NMI handler 208, the SMM handler 210, the trap handler 212, and the hypervisor 214 are part of a node 216. In some embodiments, orchestrator 202, BMC 204, OS 206, NMI handler 208, SMM handler 210, trap handler 212, hypervisor 214, and node 216 of FIGS. 2A-2C may be similar, if not identical, to the orchestrator 105, controller 115a or 115b, OS 125, NMI handler 135, SMM handler 140, OS trap handler 145, hypervisor 150, and node 120 or 120', respectively, of system 100A or 100B of FIG. 1A or 1B, and the description of these components of system 100A or 100B of FIG. 1A or 1B are similarly applicable to the corresponding components of FIGS. 2A-2C.

Referring to FIG. 2A, at operation 220, orchestrator 202, or a control plane in which the orchestrator 202 is located, detects an unresponsive node. The orchestrator 202 sends instructions to BMC 204 to resolve the unresponsive node (at operation 222). At operation 224, the BMC 204 triggers an SMI in the SMM handler 210. In response to triggering the SMI, at operation 226, the SMM handler 210 enters an SMM, which is established between the BMC 204 and the SMM handler 210 (at operation 228). At operation 230, the SMM handler 210 checks an SMI cause and updates a firmware-OS communication page. In examples, a status field of the firmware communication page is updated or set by the SMM handler 210 to indicate either a normal exception or a special exception. At operation 232, the SMM handler 210 sends an RSM instruction to OS 206 to resume execution. At operation 234, the BMC 204 triggers an NMI in the NMI handler 208.

In an example and in response to triggering the NMI, at operation 236, the NMI handler 208 enters an NMI mode, which is established between the BMC 204 and the NMI handler 208 (at operation 238). The NMI handler 208 sends an instruction to OS 206 to resume operation (at operation 240). At operation 242, the OS 206 sends gathered information to BMC 204. At operation 244, the OS 206 relays the gathered information to the control plane. Operations 238-244 correspond to a successful NMI injection 246.

Turning to FIG. 2B, the NMI handler 208 becomes stuck in NMI mode (at operation 248). After an NMI response duration has timed out (at operation 250), the BMC 204 triggers an SMI in the SMM handler 210 (at operation 252).

In response to triggering the SMI, at operation 254, the SMM handler 210 enters an SMM, which is established between the BMC 204 and the SMM handler 210 (at operation 256). At operation 258, the SMM handler 210 checks an SMI cause. In examples, the shared communication buffer includes instructions for the SMM handler 210 to set a trap flag in a saved state area of the OS 206 of the node 216 and instructions for the SMM handler 210 to resume execution using an RSM instruction after setting the trap flag. At operation 260, the SMM handler 210 sets a trap flag in the saved state area of the OS 206 based on the corresponding instructions in the shared communication buffer. At operation 262, the SMM handler 210 sends an RSM instruction to OS 206 to resume execution based on the corresponding instructions in the shared communication buffer. The trap flag being set in the saved state area causes the OS 206 to trigger a single step trap (at operation 264), which causes the OS 206 to exit from problematic code execution. The triggering of the single step trap further causes transfer of control to the trap handler 212 (at operation 266). At operation 268, the trap handler 212 determines whether the single step exception is a normal exception or a special exception. Operations 248-268 correspond to an unsuccessful NMI injection 270.

Referring to FIG. 2C, the unsuccessful NMI injection 270 further corresponds to operations 272-288. For a normal exception 276, trap handler 212 performs a normal exception dispatch (at operation 272), the normal exception dispatch being described above. At operation 274, trap handler 212 sends status information to BMC 204. Alternatively, for a special exception 286, trap handler 212 initiates a call to hypervisor 214 (at operation 278). At operation 280, the hypervisor 214 checks a firmware communication page. The hypervisor 214 discovers a dispatch reason based on contents of the firmware communication page (at operation 282), and sends status information to the BMC 204 (at operation 284). As described above, the firmware communication page has a status field that is updated or set by the SMM handler 210 to indicate whether the single step trap is for a normal exception or for a special exception. In some cases, the special exception and/or the discovered dispatch reason indicates that the single step trap is an attempt to recover from a "stuck in NMI" scenario. By checking the firmware communication page, specifically the status field thereof, the hypervisor 214 can identify which type of exception the single step trap is intended for. In examples, by performing operations on the problematic code in root mode, the hypervisor 214 causes the code execution to exit from the stuck condition that has occurred even in the NMI mode. In some examples, the hypervisor 214 encrypts data traffic received by the node 216 after exiting from the stuck condition. In some cases, sending the status information (at operation 284) includes sending the encrypted data traffic. At operation 288, the BMC 204 relays the gathered status information to the control plane (in some cases, also sending the encrypted data traffic), thus resulting in an unresponsive node resolution (at operation 290).

These and other functions of the example sequence flow 200 (and its components) are described in greater detail herein with respect to FIGS. 1A, 1B, 3, and 4A-4D.

With reference to FIG. 3, the operations of example method 300 may be performed by a controller (e.g., controller 115a, 115b, or 204 of FIGS. 1A-1B and 2A-2C). Referring to FIGS. 4A-4D, the operations of example method 400 may be performed by an OS of a node (e.g., OS 125 or 206 of nodes 120, 120', or 216 of FIGS. 1A-1B and 2A-2C).

FIG. 3 depicts an example method 300 for implementing improved RCA-based node recovery. In the example of FIG. 3, method 300, at operation 305, includes the controller receiving, from an orchestrator in a control plane, instructions to resolve issues with an unresponsive node that is associated with the controller. At operation 310, the controller sends, to a debug mode handler of the unresponsive node, instructions to enter a debug mode. Method 300, at operation 315, includes the controller determining whether an expected debug mode response has been received from a debug mode handler of the unresponsive node and within a timeout duration for the expected debug mode response. Based on a determination that an expected debug mode response has not been received from a debug mode handler of the unresponsive node and after a timeout duration for the expected debug mode response has elapsed, method 300 continues onto the process at operation 320. Based on a determination that the expected debug mode response has been received from the debug mode handler of the unresponsive node and within the timeout duration for the expected debug mode response, method 300 continues onto the process at operation 330.

At operation 320, the controller sends, to an SMM handler of the unresponsive node, instructions to enter a SMM. Method 300 further includes the controller exposing a shared communication buffer to the SMM handler of the unresponsive node (at operation 325). In examples, the shared communication buffer includes instructions for the SMM handler to set a trap flag in a saved state area of the OS of the unresponsive node and instructions for the SMM handler to resume execution using an RSM instruction after setting the trap flag. The trap flag causes the OS of the unresponsive node to exit from problematic code execution that is preventing the expected debug mode response from being sent within the timeout duration, and to transfer control to an OS trap handler of the unresponsive node. Method 300 continues onto the process at operation 330.

At operation 330, the controller receives, from the unresponsive node, status information regarding outcome of attempts to recover from a stuck condition of the debug mode. At operation 335, the controller determines whether the status information indicates resolution of the issues with the unresponsive node. Based on a determination that the status information indicates resolution of the issues with the unresponsive node, the controller sends, to the orchestrator, a message indicating unresponsive node resolution (at operation 340).

In examples, sending the instructions to enter the debug mode (at operation 310) includes injecting or triggering an NMI, where the debug mode handler is an NMI handler and where the stuck condition of the debug mode corresponds to a stuck condition due to problematic code execution in the NMI handler.

Figure 4B:
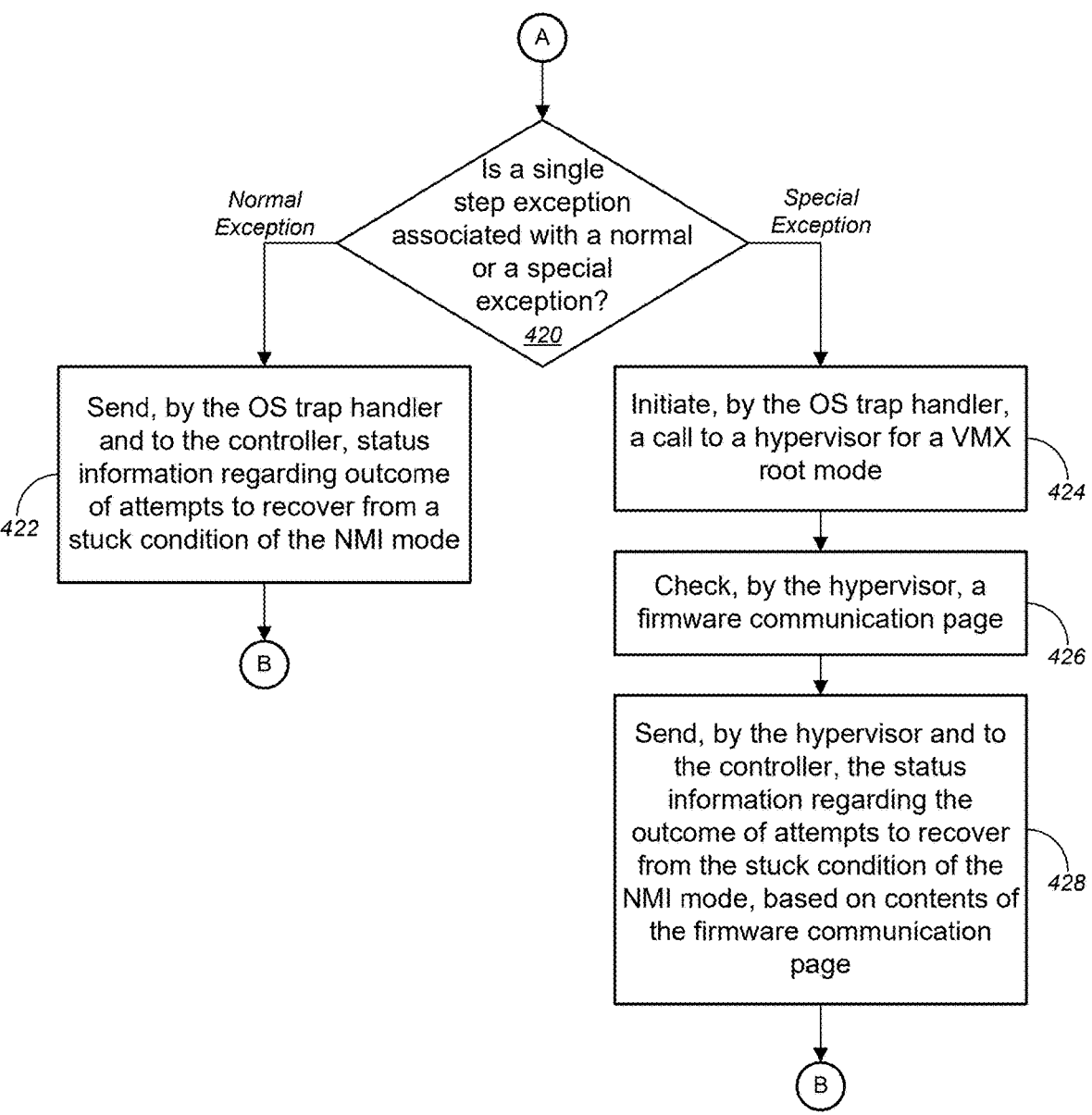

FIGS. 4A-4D depict another example method 400 for implementing improved RCA-based node recovery. In the example of FIG. 4A, method 400, at operation 402, includes an NMI handler of an unresponsive node receiving, from a controller associated with the unresponsive node, an NMI instruction to enter an NMI mode. After a timeout duration for an expected NMI mode response has elapsed without information being received by the controller from the NMI handler, an SMM handler of the unresponsive node receives, from the controller, an SMI instruction to enter an SMM (at operation 404). At operation 406, in response to receiving the SMI instruction, the SMM handler checks a cause of the SMI instruction via GPIO pins or in a shared communication buffer.

At operation 408, method 400 determines whether instructions received over the GPIO pins or in the shared communication buffer indicate to set a trap flag. Based on instructions received over the GPIO pins or in the shared communication buffer indicating to set a trap flag, the SMM handler sets a trap flag in a saved state area of the OS (at operation 410), the saved state area being accessible by the OS and the SMM handler. At operation 412, method 400 determines whether instructions in the shared communication buffer indicate to resume execution. Based on instructions received over the GPIO pins or in the shared communication buffer indicating to resume execution and after setting the trap flag, the SMM handler resumes execution by the OS, using an RSM instruction (at operation 414). At operation 416, after resuming execution and in response to the trap flag being set in the saved state area, the OS triggers a single step trap that transfers control to an OS trap handler. The OS trap handler performs, within a kernel mode, operations on a problematic code that has caused a stuck condition. By operating on the problematic code in the kernel mode, the OS trap handler causes code execution to exit from the stuck condition. The OS trap handler either returns information resulting from operation on the problematic code in the kernel mode and/or returns status information regarding operation of problematic code in the kernel mode. Method 400 further includes the unresponsive node sending status information regarding outcome of attempts to recover from the stuck condition (at operation 418). Method 400 continues onto the process at operation 420 in FIG. 4B following the circular marker denoted, "A."

At operation 420 in FIG. 4B (following the circular marker denoted, "A," in FIG. 4A), method 400 includes the OS trap handler determining whether a single step exception triggered by the single step trap is associated with a normal exception or a special exception. Based on a determination that the single step exception is associated with a normal exception, the OS trap handler sends, to the controller, status information regarding outcome of attempts to recover from a stuck condition of the NMI mode (at operation 422). Method 400 continues onto the process at operation 430 in FIG. 4C following the circular marker denoted, "B." Alternatively, based on a determination that the single step exception is associated with a special exception, the OS trap handler initiates a call to a hypervisor for a VMX root mode (at operation 424). At operation 426, the hypervisor checks a firmware communication page, and sends, to the controller, the status information regarding the outcome of attempts to recover from the stuck condition of the NMI mode, based on contents of the firmware communication page (at operation 428). Method 400 continues onto the process at operation 430 in FIG. 4C following the circular marker denoted, "B."

At operation 430 in FIG. 4C (following the circular marker denoted, "B," in FIG. 4B), method 400 includes the hypervisor discovering a dispatch reason based on the contents of the firmware communication page. Method 400 further includes the hypervisor encrypting data traffic received by the unresponsive node based on the dispatch reason (at operation 432), and sending, to the controller, the encrypted data traffic (at operation 434). At operation 436, the controller receives, from an orchestrator in a control plane, instructions to resolve issues with the unresponsive node. The controller receives, from the hypervisor, the encrypted data traffic (at operation 438), and relays the encrypted data traffic to the orchestrator (at operation 440).

Referring to FIG. 4D, prior to receiving the instructions to enter the NMI mode (at operation 402), the SMM handler receives, from the controller, an initial SMI instruction to enter an initial SMM (at operation 442). In response to receiving the initial SMI instructions (at operation 442), the SMM handler checks a cause of the SMI instruction via the GPIO pins or in the shared communication buffer (at operation 444), and updates the firmware communication page to indicate one of the normal exception or the special exception (at operation 446). At operation 448, the SMM handler determines whether instructions received over the GPIO pins or in the shared communication buffer indicate to resume execution. Based on instructions received over the GPIO pins or in the shared communication buffer indicating to resume execution, the SMM handler resumes execution by the OS, using the RSM instruction (at operation 450). Method 400 continues onto the process at operation 402 in FIG. 4A following the circular marker denoted, "C."

While the techniques and procedures in methods 300, 400 are depicted and/or described in a certain order for purposes of illustration, it should be appreciated that certain procedures may be reordered and/or omitted within the scope of various embodiments. Moreover, while the methods 300, 400 may be implemented by or with (and, in some cases, are described below with respect to) the systems, examples, or embodiments 100A, 100B, and 200 of FIGS. 1A, 1B, and 2, respectively (or components thereof), such methods may also be implemented using any suitable hardware (or software) implementation. Similarly, while each of the systems, examples, or embodiments 100A, 100B, and 200 of FIGS. 1A, 1B, and 2, respectively (or components thereof), can operate according to the methods 300, 400 (e.g., by executing instructions embodied on a computer readable medium), the systems, examples, or embodiments 100A, 100B, and 200 of FIGS. 1A, 1B, and 2 can each also operate according to other modes of operation and/or perform other suitable procedures.

As should be appreciated from the foregoing, the present technology provides multiple technical benefits and solutions to technical problems. For instance, using interrupts (such as NMI) generally raises some technical problems. For instance, one technical problem includes NMI not functioning to recover from a stuck condition when the stuck condition is caused by problematic code execution occurring at the NMI handler itself. The present technology provides implementation of improved RCA-based node recovery, by temporarily injecting or triggering SMI and causing the SMM handler to set a trap flag and to soon after resume execution using an RSM instruction. By causing temporary operations in SMM, vulnerabilities with use of SMI (e.g., memory corruption in an SMI handler) may be avoided. For a normal exception (e.g., an exception where the problematic code is not at the NMI handler), the OS trap handler performs operations on a problematic code within a kernel mode, which resolves the stuck condition. For a special exception (e.g., an exception where the problematic code is at the NMI handler), the OS trap handler calls a hypervisor for the VMX root mode. The hypervisor performing operations on the problematic code in the VMX root mode resolves the stuck condition, even if the stuck condition occurs at the NMI handler. In this manner, the reduced processor load (from the stuck condition), improved functioning of the node (due to recovery from the stuck condition), and enhanced reliability of the node may be achieved.

Figure 5:
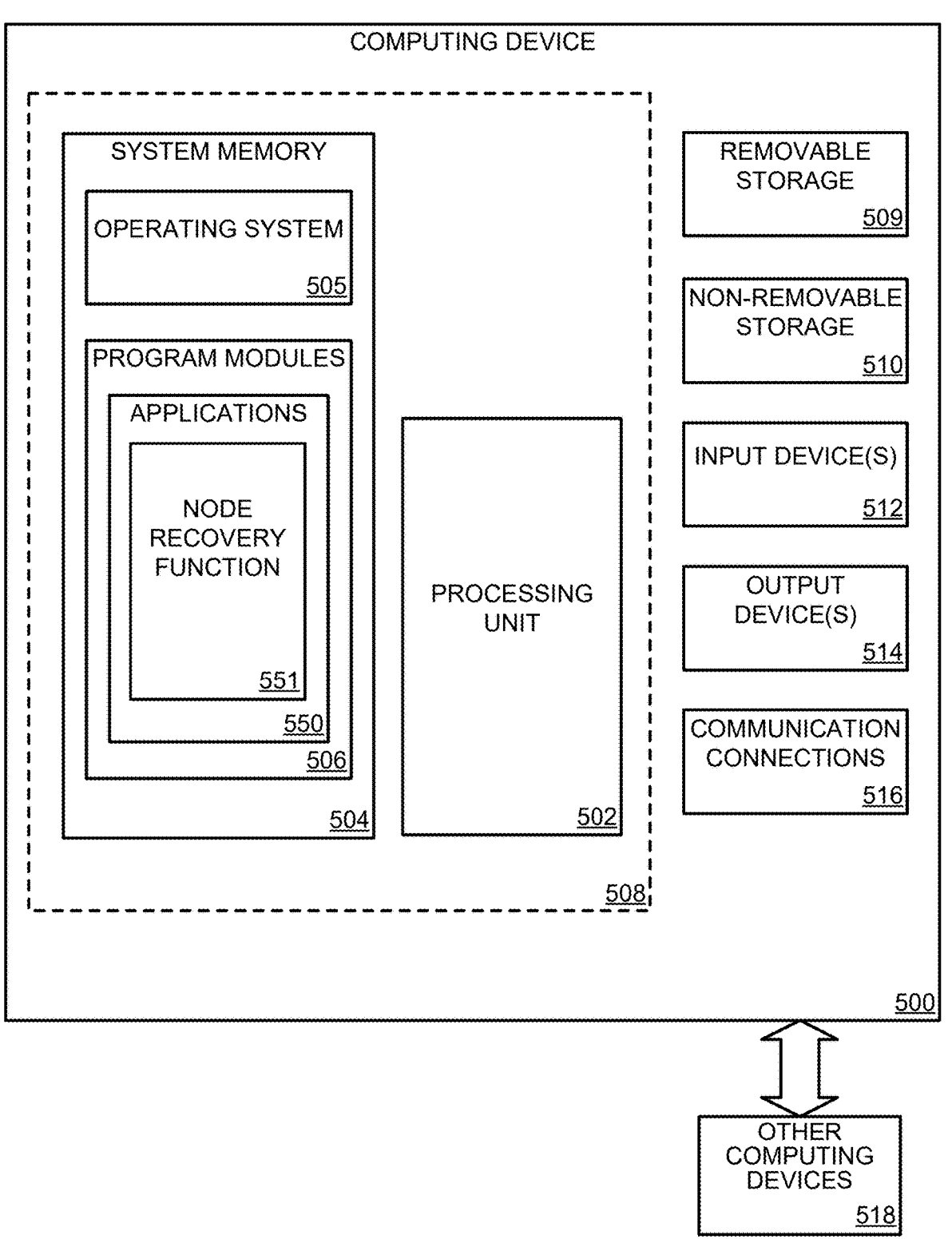
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the improved RCA-based node recovery, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as node recovery function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 3-4D, or one or more operations of the system(s) and/or apparatus(es) as described with respect to FIGS. 1A-2C, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EE-PROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a controller that executes computer executable instructions that cause the controller to perform operations comprising:
receiving, from an orchestrator in a control plane, instructions to resolve issues with an unresponsive node that is associated with the controller;
sending, to a debug mode handler of the unresponsive node, instructions to enter a debug mode;
based on a determination that an expected debug mode response has not been received from the debug mode handler of the unresponsive node and after a timeout duration for the expected debug mode response has elapsed,
sending, to a system management mode ("SMM") handler of the unresponsive node, instructions to enter an SMM, and
exposing a shared communication buffer to the SMM handler of the unresponsive node,
wherein the shared communication buffer includes instructions for the SMM handler to set a trap flag in a saved state area of an operating system ("OS") of the unresponsive node and instructions for the SMM handler to resume execution using a Resume from System Management mode ("RSM") instruction after setting the trap flag, the trap flag causing the OS of the unresponsive node to
exit from problematic code execution that is preventing the expected debug mode response from being sent within the timeout duration, and
transfer control to an OS trap handler of the unresponsive node;
receiving, from the unresponsive node, status information regarding outcome of attempts to recover from a stuck condition of the debug mode; and
based on a determination that the status information indicates resolution of the issues with the unresponsive node, sending, to the orchestrator, a message indicating unresponsive node resolution.

2. The system of claim 1, wherein the controller is part of the unresponsive node.

3. The system of claim 1, wherein sending the instructions to enter the debug mode includes triggering a non-maskable interrupt ("NMI"), wherein the debug mode handler is an NMI handler, wherein the stuck condition of the debug mode corresponds to a stuck condition due to problematic code execution in the NMI handler.

4. The system of claim 3, further comprising:
the unresponsive node, which includes the OS, the NMI handler, and the SMM handler;

wherein sending the instructions to enter the debug mode comprises sending, to the NMI handler, an NMI instruction to enter an NMI mode;
wherein sending the instructions to enter the SSM comprises sending a system management interrupt ("SMI") instruction to enter the SSM;
wherein the NMI handler is configured to:
in response to receiving the NMI instruction, enter an NMI mode unless the stuck condition occurs due to the problematic code execution in the NMI handler; and
after entering the NMI mode, send, to the controller, a message indicating unresponsive node resolution after exiting from a stuck condition that occurs due to problematic code execution in a different component of the unresponsive node;
wherein the SMM handler is configured to:
in response to receiving the SMI instruction, check the shared communication buffer;
set the trap flag in the saved state area of the OS based on the instructions to set the trap flag, the saved state area being accessible by the OS and the SMM handler; and
resume, using the RSM instruction, execution by the OS, after setting the trap flag, based on the instructions to resume execution.

5. The system of claim 4, wherein the unresponsive node further includes the OS trap handler and a hypervisor for a virtual machine extension ("VMX") root mode;
wherein the OS is further configured to:
after resuming execution and in response to the trap flag being set in the saved state area, trigger a single step trap that transfers control to the OS trap handler, thus exiting from a stuck condition due to problematic code execution that is preventing an expected NMI mode response from being sent within the timeout duration;
wherein the OS trap handler is configured to:
determine whether a single step exception triggered by the single step trap is associated with a normal exception or a special exception; and
perform one of:
based on a determination that the single step exception is associated with a normal exception, sending, to the controller, the status information regarding outcome of attempts to recover from the stuck condition of the NMI mode; or
based on a determination that the single step exception is associated with a special exception, initiating a call to the hypervisor;
wherein the SMM handler is further configured to:
update a firmware communication page to indicate one of the normal exception or the special exception;
wherein the hypervisor is configured to:
check the firmware communication page; and
send, to the controller, the status information regarding the outcome of attempts to recover from the stuck condition of the NMI mode, based on contents of the firmware communication page.

6. The system of claim 5, wherein the firmware communication page is mapped as read-only by the OS and contains a status field, wherein determining whether the single step exception triggered by the single step trap is associated with the normal exception or the special exception is based on the status field.

7. The system of claim 5, wherein the hypervisor is further configured to:
discover a dispatch reason based on the contents of the firmware communication page;

encrypt data traffic received by the unresponsive node based on the dispatch reason; and send, to the controller, the encrypted data traffic;

wherein the operations further comprise:

relaying, to the orchestrator, the encrypted data traffic.

8. A computer-implemented method, comprising:

receiving, by a non-maskable interrupt ("NMI") handler of an unresponsive node and from a controller associated with the unresponsive node, an NMI instruction to enter an NMI mode;

after a timeout duration for an expected NMI mode response has elapsed without information being received by the controller from the NMI handler, receiving, by a system management mode ("SMM") handler and from the controller, a system management interrupt ("SMI") instruction to enter an SMM;

in response to receiving the SMI instruction, checking, by the SMM handler, a cause of the SMI instruction via general purpose input/output ("GPIO") pins or in a shared communication buffer;

based on instructions received over the GPIO pins or in the shared communication buffer indicating to set a flag, setting, by the SMM handler, a trap flag in a saved state area of the OS, the saved state area being accessible by the OS and the SMM handler;

based on instructions received over the GPIO pins or in the shared communication buffer indicating to resume execution, resuming, by the SMM handler and using a Resume from System Management mode ("RSM") instruction, execution by the OS, after setting the trap flag;

after resuming execution and in response to the trap flag being set in the saved state area, triggering, in the OS, a single step trap that transfers control to an OS trap handler, thus exiting from a stuck condition due to problematic code execution that is preventing the expected NMI mode response from being sent within the timeout duration; and sending, by the unresponsive node, status information regarding outcome of attempts to recover from the stuck condition.

9. The computer-implemented method of claim 8, further comprising:

determining, by the OS trap handler, whether a single step exception triggered by the single step trap is associated with a normal exception or a special exception; and performing one of:

based on a determination that the single step exception is associated with a normal exception, sending, by the OS trap handler and to the controller, status information regarding outcome of attempts to recover from a stuck condition of the NMI mode; or based on a determination that the single step exception is associated with a special exception, initiating, by the OS trap handler, a call to a hypervisor for a virtual machine extension ("VMX") root mode;

checking, by the hypervisor, a firmware communication page; and sending, to the controller, the status information regarding the outcome of attempts to recover from the stuck condition of the NMI mode, based on contents of the firmware communication page.

10. The computer-implemented method of claim 9, wherein the controller, the OS, the NMI handler, the SMM handler, the OS trap handler, and the hypervisor are part of the unresponsive node.

11. The computer-implemented method of claim 9, wherein the OS, the NMI handler, the SMM handler, the OS trap handler, and the hypervisor are part of the unresponsive node, and the controller is external, yet communicatively coupled, to the unresponsive node.

12. The computer-implemented method of claim 9, further comprising:

prior to receiving the instructions to enter the NMI mode, receiving, by the SMM handler and from the controller, an initial SMI instruction to enter an initial SMM;

in response to receiving the initial SMI instructions, checking, by the SMM handler, a cause of the initial SMI instruction via the GPIO pins or in the shared communication buffer, and updating, by the SMM handler, the firmware communication page to indicate one of the normal exception or the special exception; and based on instructions received over the GPIO pins or in the shared communication buffer indicating to resume execution, resuming, by the SMM handler and using the RSM instruction, execution by the OS.

13. The computer-implemented method of claim 9, further comprising:

discovering, by the hypervisor, a dispatch reason based on the contents of the firmware communication page;

encrypting, by the hypervisor, data traffic received by the unresponsive node based on the dispatch reason; and send, by the hypervisor and to the controller, the encrypted data traffic.

14. The computer-implemented method of claim 13, further comprising:

receiving, by the controller and from an orchestrator in a control plane, instructions to resolve issues with the unresponsive node;

receiving, by the controller and from the hypervisor, the encrypted data traffic; and relaying, by the controller and to the orchestrator, the encrypted data traffic.

15. A node, comprising:

a processor;

memory comprising instructions executable by the processor;

a system management mode ("SMM") handler, which is configured to:

receive, from a controller associated with the node, a system management interrupt ("SMI") instruction to enter an SMM;

in response to receiving the SMI instructions, checking a cause of the SMI instruction via general purpose input/output ("GPIO") pins or in a shared communication buffer between the controller and the SMM handler;

based on instructions received over the GPIO pins or in the shared communication buffer indicating to set a trap flag, setting a trap flag in a saved state area of an operating system ("OS"), the saved state area being accessible by the OS and the SMM handler; and based on instructions received over the GPIO pins or in the shared communication buffer indicating to resume execution, resuming, using a Resume from System Management mode ("RSM") instruction, execution by the OS, after setting the trap flag; and the OS, which is configured to:

exit from a stuck condition due to problematic code execution by triggering a single step trap, after resuming execution and in response to the trap flag being set in the saved state area; and send status information regarding outcome of attempts to recover from the stuck condition.

16. The node of claim 15, further comprising:

a non-maskable interrupt ("NMI") handler, which is configured to:

receive, from the controller, an NMI instruction to enter an NMI mode;

in response to receiving the NMI instruction, enter the NMI mode unless the stuck condition occurs due to problematic code execution in the NMI handler; and after entering the NMI mode, send, to the controller, a message indicating unresponsive node resolution after exiting from a stuck condition that occurs due to problematic code execution in a different component of the node;

wherein receiving the instructions to enter the SMM occurs after a timeout duration for an expected NMI mode response has elapsed without information being received from the NMI handler and forwarded to the controller.

17. The node of claim 15, further comprising:

an OS trap handler, which is configured to:

determine whether a single step exception triggered by the single step trap is associated with a normal exception or a special exception; and perform one of:

based on a determination that the single step exception is associated with a normal exception, sending, to the controller, the status information regarding outcome of attempts to recover from the stuck condition of the NMI mode; or based on a determination that the single step exception is associated with a special exception, initiating a call to a hypervisor for a virtual machine extension ("VMX") root mode.

18. The node of claim 17, further comprising:

the hypervisor, which is configured to:

check a firmware communication page; and send, to the controller, the status information regarding the outcome of attempts to recover from the stuck condition of the NMI mode, based on contents of the firmware communication page.

19. The node of claim 18, wherein the hypervisor is further configured to:

discover a dispatch reason based on the contents of the firmware communication page;

encrypt data traffic received by the node based on the dispatch reason; and send, to the controller, the encrypted data traffic;

wherein the operations further comprise:

relaying, to an orchestrator, the encrypted data traffic.

* * * * *